(12) United States Patent
Serrano

(10) Patent No.: US 11,721,063 B1
(45) Date of Patent: Aug. 8, 2023

(54) SYSTEMS AND METHODS FOR DYNAMIC IMAGE RENDERING USING A DEPTH MAP

(71) Applicant: Illuscio, Inc., Culver City, CA (US)

(72) Inventor: Harold Serrano, Laveen, AZ (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/159,969

(22) Filed: Jan. 26, 2023

(51) Int. Cl.
| | | |
|---|---|---|
| G06T 15/20 | (2011.01) | |
| G06T 7/11 | (2017.01) | |
| G06T 7/80 | (2017.01) | |
| G06T 7/50 | (2017.01) | |

(52) U.S. Cl.
CPC .............. *G06T 15/205* (2013.01); *G06T 7/11* (2017.01); *G06T 7/50* (2017.01); *G06T 7/80* (2017.01); *G06T 2207/10028* (2013.01); *G06T 2207/20016* (2013.01); *G06T 2210/36* (2013.01); *G06T 2210/56* (2013.01)

(58) Field of Classification Search
CPC ....... G06T 2207/20016; G06T 2210/56; G06T 7/11; G06T 7/80; G06T 7/50; G06T 2207/10028; G06T 15/205; G06T 2210/36
See application file for complete search history.

(56) References Cited

U.S. PATENT DOCUMENTS

| | | | | |
|---|---|---|---|---|
| 7,929,801 | B2* | 4/2011 | Nakamura | G06T 7/571 382/265 |
| 8,681,151 | B2* | 3/2014 | Coombe | G06T 17/20 345/629 |
| 2012/0113109 | A1* | 5/2012 | Lee | G06T 17/00 382/154 |
| 2017/0094243 | A1* | 3/2017 | Venkataraman | G06T 7/557 |
| 2017/0294047 | A1* | 10/2017 | Asakura | A63F 13/57 |
| 2020/0035039 | A1* | 1/2020 | Adachi | G06T 5/003 |
| 2020/0244882 | A1* | 7/2020 | Hicks | H04N 21/4728 |
| 2022/0245762 | A1* | 8/2022 | Ma | G06T 3/4053 |
| 2022/0392138 | A1* | 12/2022 | Kokins | G06T 1/60 |
| 2023/0011969 | A1* | 1/2023 | Vaello Paños | G01S 17/894 |

* cited by examiner

*Primary Examiner* — Phi Hoang
(74) *Attorney, Agent, or Firm* — Ansari Katiraei LLP; Arman Katiraei; Sadiq Ansari

(57) ABSTRACT

Disclosed is a rendering system that dynamically changes the resolution at which image data in a field-of-view ("FOV") is rendered based on the proximity or depth of the image data relative to the render position or camera position. The rendering system selects the image data that is within the FOV, and generates a depth map with a set of distance measures for different distances or depths of the image data in the FOV. The rendering system selects a dynamic resolution at which to render the FOV based on the set of distance measures from the depth map, and renders the image data and/or FOV at the dynamic resolution.

20 Claims, 7 Drawing Sheets

SYSTEMS AND METHODS FOR DYNAMIC IMAGE RENDERING USING A DEPTH MAP

BACKGROUND

A point cloud is a three-dimensional ("3D") image format that uses data points distributed in a 3D space to accurately model and/or represent the form and visual characteristics of a 3D object or scene. The point cloud contains millions or billions of data points to provide an accurate high-resolution representation of the modeled 3D object or scene. Each data point is defined with positional elements for the position of that data point in the 3D space, and with non-positional elements for the visual characteristics of the data point.

Rendering the point cloud data points is slow because of the amount of data that is associated with each data point (e.g., the position and non-positional elements) and because of the number of data points that are within any given field-of-view ("FOV"). For instance, rendering all data points within the FOV of a point cloud may result in an image having more than the 33 million pixels of an ultra-high definition ("UHD" or "8K") image, and may prevent the rendering system from generating the images at a smooth or acceptable frame rate (e.g., at or faster than 24 frames per second).

DETAILED DESCRIPTION OF PREFERRED EMBODIMENTS

Figure 1:
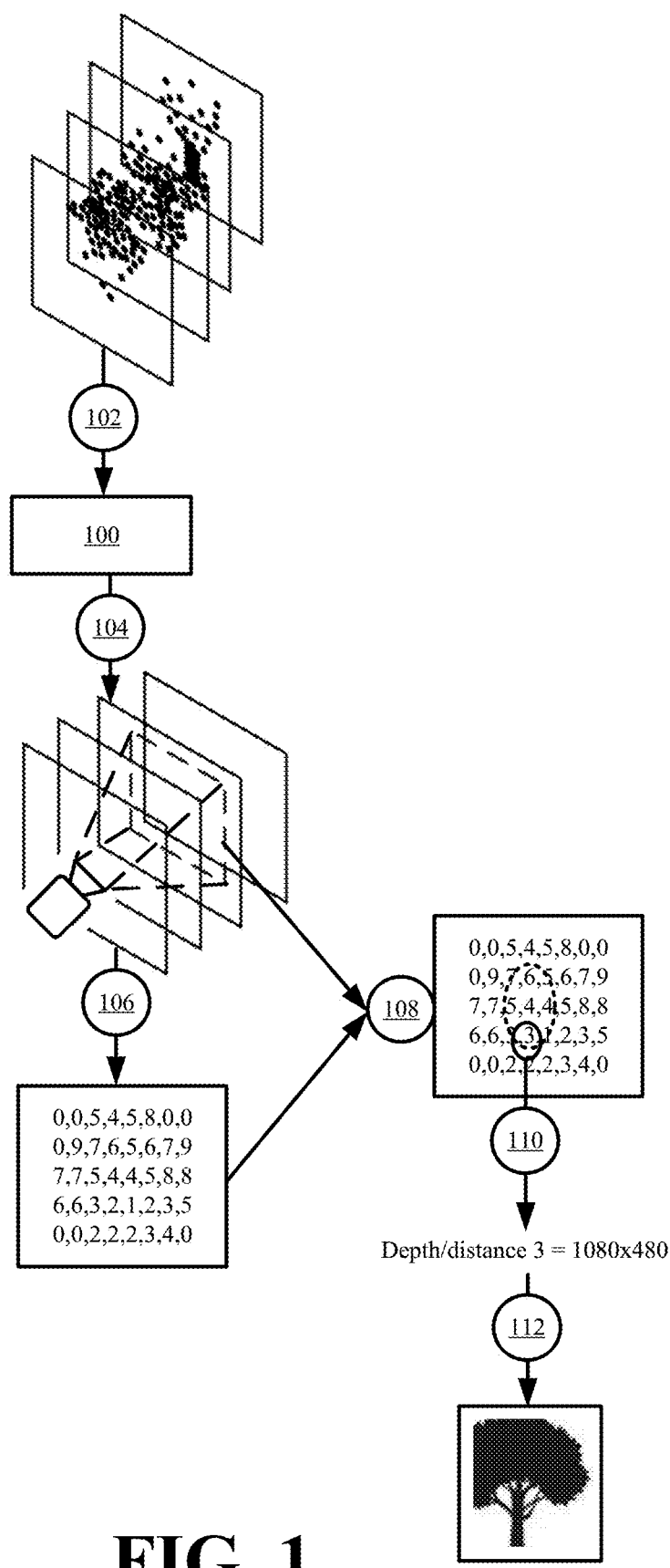
FIG. 1 illustrates an example of dynamic image rendering based a depth map associated with the image field-of-view ("FOV") in accordance with some embodiments presented herein.

The following detailed description refers to the accompanying drawings. The same reference numbers in different drawings may identify the same or similar elements.

Provided are systems and methods for dynamic image rendering using a depth map. The dynamic image rendering includes changing the level-of-detail at which image data in a field-of-view ("FOV") is rendered based on the proximity or depth of the image data relative to the render position or camera position. For instance, the image data in the FOV is rendered at a higher first resolution when the distance separating the image data in the FOV from the camera position is less than a particular distance, and the image data in the FOV is rendered at progressively lower resolutions as the distance separating the image data in the FOV from the camera position is increasingly more distant from the camera position and/or the particular distance specified for the first resolution.

The dynamic image rendering is implemented by a rendering system. The rendering system generates a depth map for the distance and/or depth between the camera position and the data points or image data in the FOV, and sets the rendering resolution based on the distances within the depth map. In some embodiments, the depth map is defined as a texture file.

The rendering system analyzes the distances and/or depths defined in the depth map for image data within a particular region-of-interest of the FOV. For instance, the region-of-interest may include the image data that falls within a circle, square, rectangle, or other shape that is positioned on the center of the FOV.

The rendering system sets the rendering level-of-detail or resolution based on the distances and/or depths from the depth map that are specified for the image data within the particular region-of-interest of the FOV. In other words, the rendering system uses a subset of the depth and/or distance measures within the particular region-of-interest to dynamically set the rendering resolution for the entire FOV rather than use all the depth and/or distance measures in the depth map defined for all image data in the FOV.

In some embodiments, the rendering system sets the level-of-detail or resolution based on the visual acuity of the human eye and/or the amount of detail that the human eye is able to discern at the distance or depth detected within the particular region-of-interest. For instance, the rendering system lowers the resolution of the image data in the FOV so that extraneous detail that cannot be differentiated by the viewer at the determined distance or depth of the region-of-interest is not rendered while the differentiable detail is preserved and rendered. Accordingly, the dynamic image rendering performed by the rendering system generates images for different FOVs from the same point cloud or three-dimensional ("3D") model at different dynamically determined levels-of-detail or resolutions based on the different distances separating the camera or render position from the image data in the particular region-of-interest of each FOV.

The dynamic image rendering optimizes the rendering of 3D image data in a manner that is different than foveated rendering techniques. For instance, foveated rendering techniques involve rendering the image data at the center of every image or every FOV at a specific first resolution and lowering the resolution at which the image data surrounding the center of the image is rendered as the distance of the image data from the center of image increases. In other words, the foveated rendering techniques do not determine a dynamic resolution for each FOV based on the distance or depth between the camera position and the image data within that FOV as is done by the rendering system and the described dynamic image rendering. Instead, the foveated rendering techniques render the center of every image at the same first resolution regardless of whether the image data at the center of a first FOV is at a different depth or distance from the camera than the image data at the center of a second FOV.

FIG. 1 illustrates an example of dynamic image rendering based a depth map associated with the image FOV in accordance with some embodiments presented herein. Rendering system 100 receives (at 102) a high-resolution 3D image or model. In some embodiments, the high-resolution 3D image or model is a point cloud.

The point cloud may be generated by scanning a scene or other 3D environment using one or more of a 3D or depth-sensing camera, a structured light or patterned light imaging device, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments. In some embodiments, the point cloud is a digitally created scene of a virtual object and/or environment.

The point cloud data points differ from pixels of a two-dimensional ("2D") image, because certain regions of the point cloud may have no data points, lower densities of data points, and/or higher densities of data points based on varying amounts of visual information that is detected or scanned at those regions. Additionally, the position of the point cloud data points are defined in 3D space using x, y, and z coordinate values. In contrast, pixels of a 2D image are defined in 2D space and have a uniform density or fixed arrangement that is defined by the resolution of the 2D image. In other words, the point cloud data points have a non-uniform placement or positioning, whereas the 2D image have pixel data for each pixel of a defined resolution (e.g., 640×480, 800×600, etc.).

Each point cloud data point is defined with a plurality of elements. The plurality of elements includes a first set of positional elements, and a second set of non-positional or descriptive elements.

The positional elements include coordinates within 3D space. For instance, each point cloud data point includes x-coordinate, y-coordinate, and z-coordinate elements to capture the position of a corresponding physical point from a surface, feature, or object. The positional elements further include a surface normal. The surface normal defines the angle, direction, or orientation that the surface, feature, or object represented by the data point faces or is exposed to. More specifically, the surface normal is a line, ray, or vector that is perpendicular to the scanned surface, feature, or object represented by the data point.

The non-positional elements include information about the detected characteristics of the surface, feature, or object at a corresponding position in the scanned scene. The characteristics may correspond to a detected color. The color may be represented using red, green, blue ("RGB"), and/or other values. In some embodiments, a data point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the data point.

In some embodiments, the non-positional elements store other measured or derived characteristics including the chrominance, hardness, translucence, reflectivity, luminance, metallic characteristics, roughness, specular, diffuse, albedo, index of refraction ("IOR"), and/or other properties from the imaged surface, feature, or object. In some embodiments, the non-positional elements may directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic".

In some embodiments, the characteristics may be related to properties of the device used to generate each of the data points. For instance, the characteristics may include a Tesla strength value to quantify the strength of the magnetic field that was used in detecting and/or imaging the surface, feature, or object represented by a particular point cloud data point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding data point in 3D space.

Each point cloud data point may include an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

Rendering system 100 determines (at 104) a particular FOV within the point cloud to render. For instance, rendering system may receive a request that specifies the particular FOV, or may receive input for setting a position of a virtual camera within the 3D space of the point cloud. Rendering system 100 may determine (at 104) the particular FOV based on the virtual camera position and/or settings associated with the virtual camera (e.g., depth-of-field, focal distance, etc.). Determining (at 104) the particular FOV includes selecting the set of point cloud data points that are within the 3D volume of space spanned by the particular FOV and/or that is defined as the particular FOV.

Rendering system 100 generates (at 106) a depth map for the selected set of point cloud data points within the particular FOV. In some embodiments, the depth map is a texture or other file that stores the z-coordinate position, depth, and/or distance of the selected set of data points from the camera or render position. In other words, the depth map defines the depth or distance of each data points in the FOV, and/or is a representation of the particular FOV with only the depth or distance values for the data points in the particular FOV. If the particular FOV contains two data points that overlap (e.g., have the same x and y coordinate positions but different z coordinate positions), the texture map may store the depth or distance of the data point that is closest to the camera or render position or that is in the nearest plane of the particular FOV.

Rendering system 100 selects (at 108) a region-of-interest within the particular FOV and the values defined in the depth map for the data points in the region-of-interest. The regionof-interest specifies a subregion or subvolume that is a focal point within the particular FOV or the most important parts of the particular FOV.

In some embodiments, the region-of-interest corresponds to the region at the center of the particular FOV. In some such embodiments, rendering system 100 defines a circle, square, rectangle, or other shape that is placed about the center of the particular FOV. In some other embodiments, the region-of-interest includes the region within the particular FOV with the highest concentration or density of data points, with the greatest variation in the non-positional elements (e.g., greatest contrast or color variation), and/or with other patterns, commonality, or differentiation in the positional or non-positional elements of the data points.

Rendering system 100 sets (at 110) the rendering resolution and/or level-of-detail based on the depths or distances from the depth map within the region-of-interest. For instance, rendering system 100 determines the depth measurements from the depth map that are defined for the subset of data points within the particular FOV region-of-interest.

In some embodiments, rendering system 100 sets (at 110) the rendering resolution and/or level-of-detail based on the closest or nearest depth or distance measurement from the set of depth or distance measurements defined for the region-of-interest. In other words, rendering system 100 sets (at 110) the rendering resolution and/or level-of-detail based on the minimum or smallest depth or distance measure associated with a data point in the region-of-interest. In some other embodiments, rendering system 100 sets (at 110) the rendering resolution and/or level-of-detail based on the average, median, or other value that is derived from the set of depth or distance measurements defined for the region-of-interest.

Rendering system 100 may set (at 110) the rendering resolution and/or level-of-detail based on the depth or distance measures for the data points in the region-of-interest and one or more thresholds. In some embodiments, the thresholds are defined according to the level-of-detail or resolution that the human eye can detect at a given distance. For instance, a first threshold specifies a first resolution for the maximum detail that the human eye differentiates for data points at a first minimum distance from the viewer, and a second threshold specifies a second resolution for the maximum detail that the human eye differentiates for data points at a second minimum distance from the viewer. In some other embodiments, the thresholds are defined according to a desired maximum resolution for the closest plane or data points in the particular FOV region-of-interest, resources of rendering system 100, a desired frame rate, decimation amounts associated with different depths or distances, and/or other criteria for determining the quality at which to render the particular FOV and data points at different depths in the particular FOV.

Rendering system 100 renders (at 112) the image data or selected set of data points that are within the particular FOV at the resolution and/or level-of-detail set (at 110) based on the depth map distances for the image data or data points within the region-of-interest of the particular FOV. Rendering (at 112) the image data includes decimating one or more data points within the particular FOV, defining a new data point to replace two or more data points in the particular FOV, blending, blurring, or rendering one or more of the data points out-of-focus, and/or otherwise reducing the image quality associated with different subsets of the data points at different parts of the particular FOV. Consequently, the image that is generated from rendering (at 112) the image data at the set resolution and/or level-of-detail defined from the depth map presents the image data in the particular FOV at a different level-of-detail than the level-of-detail associated with the original data points in the particular FOV.

In any event, rendering (at 112) the image data at the set resolution and/or level-of-detail involves reducing the processing overhead, resources, and time required to generate the image in a dynamic manner that minimally affects the image quality. Specifically, the dynamic image rendering generates images for different FOVs within the same point cloud or 3D model at different resolutions with each image taking a different amount of time to render based on the different resolution and the different amount of image data that is dynamically included with each FOV based on the depth or distance measurements associated with the depth map created for each FOV.

Despite the different resolutions and/or levels-of-detail at which the different FOVs are rendered, the image quality remains consistent. The dynamic image rendering discards or removes the superfluous detail that does not improve the image quality based on the depths or distances associated with that detail in the depth map, and preserves the detail that is essential to the FOV being rendered.

Rendering system 100 further optimizes the rendering of the different FOVs at different dynamically determined resolutions and/or levels-of-detail by associating the selectable levels-of-detail to different nodes from a tree-based representation of the point cloud or 3D model being rendered. The tree-based representation is defined with leaf nodes and parent nodes at different layers above the leaf nodes that represent the image data or data points of the point cloud or 3D model at different regions of the FOV with increasing amounts of decimation or at lower levels-of-detail. For instance, rendering system 100 may generate or obtain a binary tree, octree, k-dimensional tree, and/or other tree-based representation of the point cloud or the FOV within the point cloud with the root node of the tree representing the image data at the lowest level-of-detail (e.g., greatest amount of decimation) and with the leaf nodes of the tree representing the original image data or data points of the point cloud or the FOV.

Figure 2:
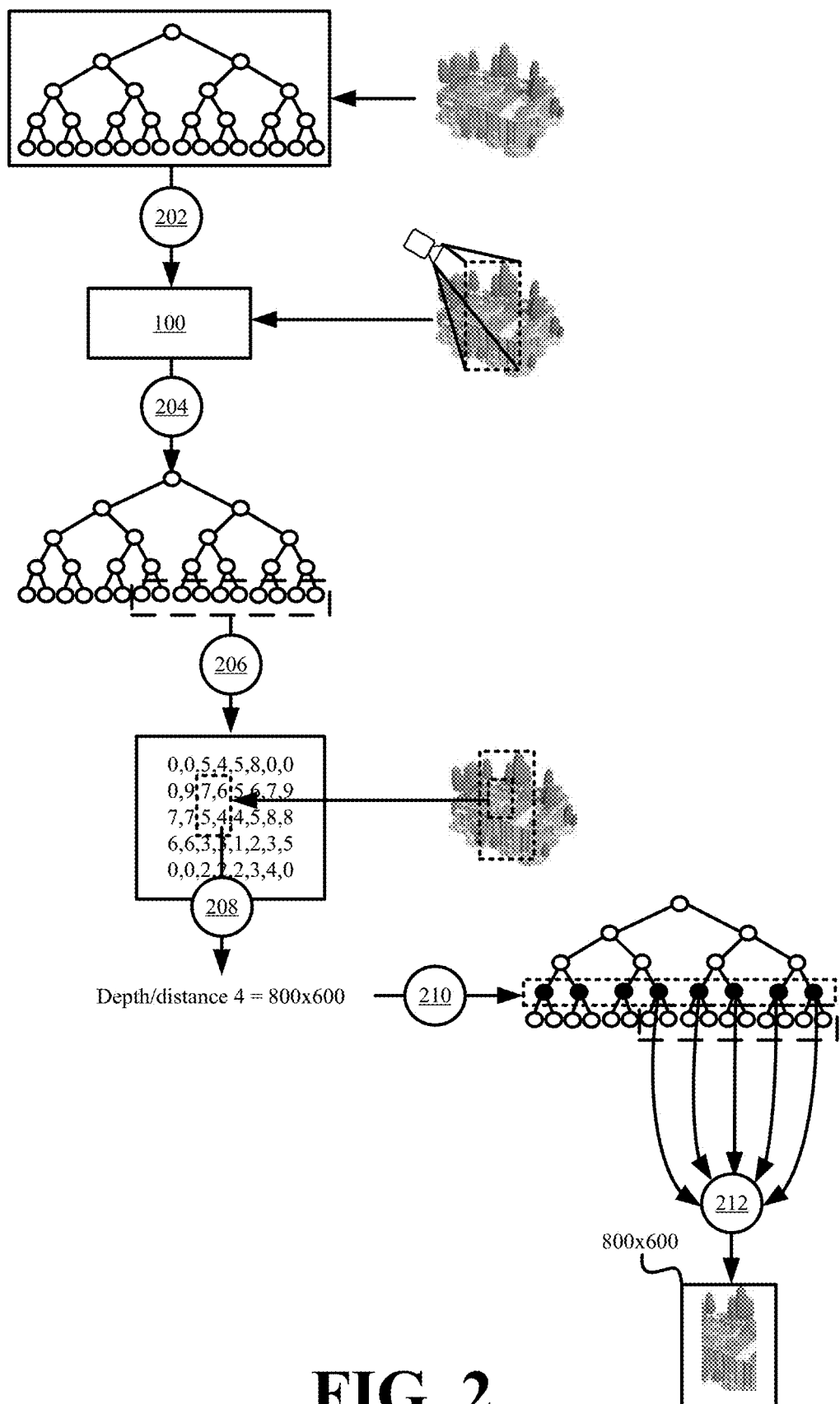
FIG. 2 illustrates an example of rendering an image at a dynamic level-of-detail using a depth map and tree-based representation of the image data in accordance with some embodiments presented herein.

FIG. 2 illustrates an example of rendering an image at a dynamic level-of-detail using a depth map and tree-based representation of the image data in accordance with some embodiments presented herein. Rendering system 100 obtains (at 202) a binary tree representation of a point cloud in response to a request to render the point cloud from a particular FOV.

The binary tree includes leaf nodes that correspond to the individual data points distributed in the 3D space of the point cloud. Each parent node that is directly or indirectly linked to two or more leaf nodes represents the image data associated with the two or more leaf nodes at a different level-of-detail and/or a different amount of decimation. The closer the parent node is to the root node, the lower the level-of-detail or the greater the amount of decimation that is associated with that parent node. For instance, a first parent node at a first layer of the binary tree represents a particular region of the point cloud at a first resolution or with a first decimated set of data points, and a second parent node at a second layer of the binary tree represents the same particular region at a second resolution or with a second decimated set of data points. Accordingly, the representation of the point cloud at the different levels-of-detail or resolutions is predefined at the different layers of the binary tree.

Rendering system 100 selects (at 204) the leaf nodes that correspond to the data points or image data in a desired FOV, and generates (at 206) the depth map for the data points or image data in the desired FOV. Rendering system 100 selects (at 208) the level-of-detail or resolution at which to render the particular FOV based on the depths or distances defined in the depth map for the image data or data points in a region-of-interest of the particular FOV. In some embodiments, the region-of-interest corresponds to the center or focal point within the particular FOV, one or more important objects or elements within the particular FOV, or all of the particular FOV.

Rendering system 100 determines (at 210) that the parent nodes at the first layer of the tree-based representation directly above the leaf nodes provide the image data at the selected (at 208) level-of-detail or resolution. Accordingly, rendering system 100 renders (at 212) the decimated image data at the selected (at 208) level-of-detail or resolution that is associated with a subset of the parent nodes at the first layer of the binary tree that are directly or indirectly linked to the selected (at 204) leaf nodes corresponding to the data points or image data in the desired FOV. Rendering system 100 directly renders (at 212) the image data contained by the subset of parent nodes rather than decimate the image data of the selected (at 204) leaf nodes corresponding to the data points or image data in the desired FOV before rendering at the selected level-of-detail or resolution.

When the level-of-detail or resolution associated with the nodes at the different layers of the tree-based representation do not exactly match the level-of-detail or resolution selected based on the depth map values, rendering system 100 may select the layer or nodes of the tree-based representation with a level-of-detail or resolution that is closest to or slightly greater than the desired level-of-detail or resolution. In any case, rendering system 100 leverages the already decimated image data within the tree-based representation to generate images for the desired FOV at the level-of-detail or resolution that is dynamically determined from the depth map created for that desired FOV.

Figure 3:
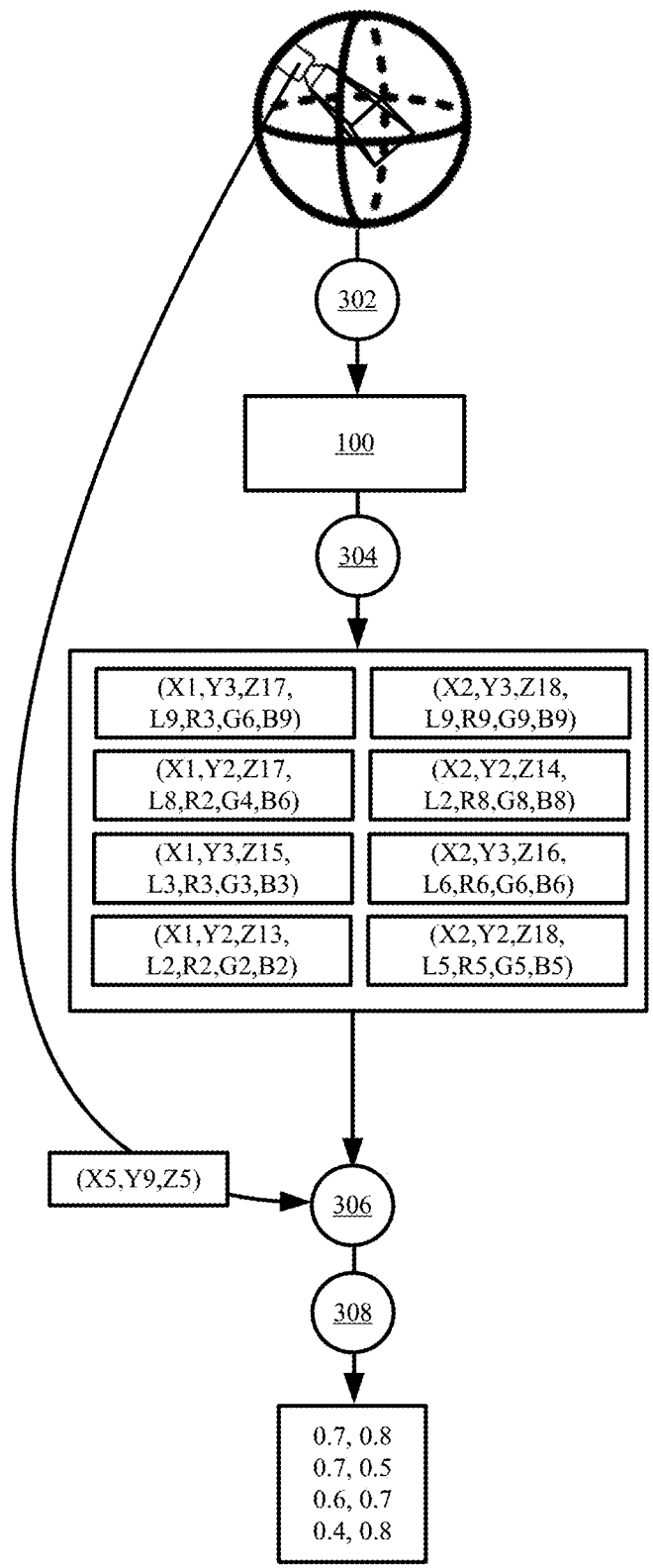
FIG. 3 illustrates an example of generating the depth map for the dynamic image rendering in accordance with some embodiments presented herein.

FIG. 3 illustrates an example of generating the depth map for the dynamic image rendering in accordance with some embodiments presented herein. Rendering system 100 receives (at 302) a particular FOV at which to render a point cloud or 3D model. Receiving (at 302) the particular FOV may include receiving coordinates or a position of a virtual camera within the 3D space of the point cloud or 3D model.

Rendering system 100 selects (at 304) the set of image data or data points that are within the particular FOV. In particular, rendering system 100 defines coordinates for the volume or 3D region of the particular FOV, and selects (at 304) the set of data points with positional elements defined within the coordinates of the particular FOV.

Rendering system 100 computes (at 306) a distance or depth between each data point in the particular FOV and the position of the camera or render position capturing the particular FOV. In some embodiments, the distance or depth corresponds to the data point z-coordinate position. In some other embodiments, the distance or depth corresponds to a distance or depth measure that is computed based on a difference between the position of the camera or render position and the position of each data point in the particular FOV. In still some other embodiments, the distance or depth is computed based on a distance of each data point in the particular FOV to a near plane of the particular FOV, wherein the near plane of the particular FOV corresponds to the closest depth at which a data point can be rendered.

Rendering system defines (at 308) the depth map based on the computed (at 306) distance or depth between each data point and the camera or render position. In some embodiments, the depth map includes values between 0 and 1, wherein a value of 0 indicates a closest depth to the camera or render position or a data point that is positioned in the near plane of the particular FOV, and a value of 1 indicates a furthest depth or a data point that is positioned in the far plane of the particular FOV.

In some embodiments, the dynamic image rendering includes adjusting the size, shape, and/or position of the region-of-interest in order to dynamically modify the part of the depth map that is used to determine the level-of-quality or resolution for different FOVs. Specifically, rendering system 100 may specify a different region-of-interest for different FOVs based on the image data contained within each FOV, predefined regions-of-interest associated with each FOV, eye-tracking, and/or factors.

Figure 4:
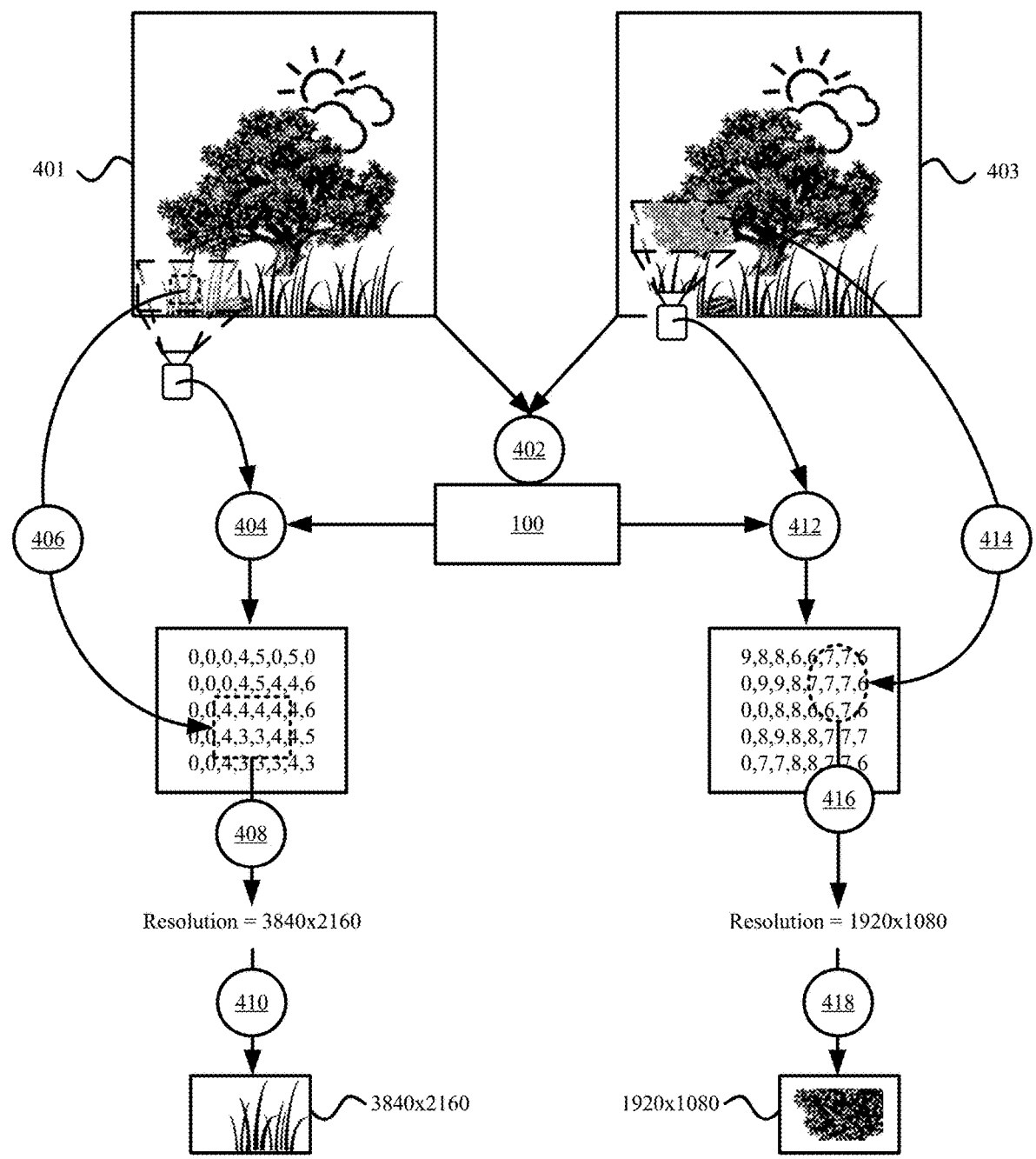
FIG. 4 illustrates an example of adjusting the region-of-interest used in conjunction with the depth maps for different FOVs in accordance with some embodiments presented herein.

FIG. 4 illustrates an example of adjusting the region-of-interest used in conjunction with the depth maps for different FOVs in accordance with some embodiments presented herein. FIG. 4 illustrates first FOV 401 within a particular 3D scene, and second FOV 403 within the same particular 3D scene. First FOV 401 and second FOV 403 include partially overlapping or common sets of image data and other non-overlapping or different sets of image data. For instance, first FOV 401 may be defined based on a first camera or render position, and second FOV 403 may be defined in response to shifting, rotating, tilting, or moving from the first camera or render position to a second camera or render position in order to animate or move within the point cloud. Rendering system 100 receives (at 402) a request to render the particular 3D scene from first FOV 401 and second FOV 403.

Rendering system 100 defines (at 404) a first depth map based on the positioning of the data points in first FOV 401 relative to a first camera or render position from which first FOV 401 is defined or relative to a near plane of first FOV 401. Rendering system 100 selects (at 406) a first region-of-interest within first FOV 401 to be used in conjunction with the first depth map to determine (at 408) a first level-of-detail or first resolution at which to render first FOV 401. Specifically, rendering system 100 determines the depths or distances specified in the first depth map for the data points that are located in the first region-of-interest within first FOV 401, and sets the first level-of-detail or first resolution based on the closest or minimum depth or distance specified in the first depth map for the data points that are located in the first region-of-interest within first FOV 401. Rendering system 100 renders (at 410) the data points in the first FOV 401 at the first level-of-detail or first resolution.

Rendering system 100 defines (at 412) a second depth map based on the positioning of the data points in second FOV 403 relative to a second camera or render position from which second FOV 403 is defined or relative to a near plane of second FOV 403. Rendering system 100 selects (at 414) a second region-of-interest within second FOV 403. The second region-of-interest has a different form, size, and position in second FOV 403 than the first region-of-interest used in determining (at 408) the first level-of-detail or first resolution for first FOV 401. For instance, rendering system 100 may select (at 414) the second region-of-interest to focus on a new element, object, or feature that is present in second FOV 403 and that is not present in first FOV 401.

Rendering system 100 determines (at 416) a second level-of-detail or second resolution at which to render second FOV 403 based on the depths or distances specified in the second depth map for the data points that are located in the second region-of-interest within second FOV 403. Rendering system 100 renders (at 418) the data points in the second FOV 403 at the second level-of-detail or second resolution.

Accordingly, rendering system 100 optimizes the rendering of the 3D scene by using the depth map for each FOV to dynamically determine the resolution at which to render that FOV. Specifically, rendering system 100 uses the depth maps to render FOVs with more distant image data at a lower resolution that FOVs with image data that is closer to the camera or render position. In other words, rendering system 100 preserves the detail in a FOV that is closer to the viewer and removes unnecessary or undifferentiable detail from a FOV that is farther from the viewer, thus preserving processing and/or rendering resources and generating images with consistent image quality in less time than when rendering all the image data and detail at different distances.

In some embodiments, rendering system 100 selects (at 406 and 414) the different size, shape, and/or position for the first region-of-interest and the second region-of-interest based on an analysis of the data points within the respective first FOV 401 and second FOV 403. For instance, rendering system 100 positions the first region-of-interest and the second region-of-interest over the parts of each FOV (e.g., first FOV 401 and second FOV 403) that are determined to draw the viewer's focus or that correspond to the focal point in each FOV. In some embodiments, the focal point in a FOV may be determined to include the region with the densest concentration of image data or data points, wherein the region with the densest concentration of image data or data points may be indicative of the region with the most visual detail. In some embodiments, the focal point in a FOV may be determined to include the region with the largest variation in visual characteristics (e.g., greatest color, contrast, and/or other variation in the non-positional elements), wherein the difference in visual characteristics may be used to differentiate the focal point from background or other uniform regions within the FOV that do not draw the viewer's interest.

In some embodiments, rendering system 100 may define the region-of-interest based on where the viewer is looking. For instance, rendering system 100 uses one or more cameras that are directed at the viewer's face and that track eye movement of the viewer. Based on the tracked eye movement, rendering system 100 determines the regions that are of most interest in each FOV to the viewer and/or that the viewer is focused on, and defines the region-of-interest to overlap with where the viewer is looking.

In some embodiments, rendering system 100 may define the region-of-interest based on the direction of the camera movement. For instance, if the camera is moved to the right, rendering system 100 defines the region-of-interest over the new image data that comes into the FOV and/or the rightmost image data rather than the image data that was present in the last FOV.

In some embodiments, the region-of-interest may be predefined for each FOV or for different objects represented by sets of data points falling within the different FOVs. For instance, first FOV 401 may include a first set of data points in the bottom region that correspond to a first important object, and the first set of data points may be tagged in the 3D scene such that when the first set of data points fall within a FOV, the region-of-interest is set on and around the first set of data points, and the level-of-detail or resolution for that FOV is set to present the first set of data points without loss of detail based on their positioning in the FOV. Similarly, second FOV 403 may include a second set of data points in the top region that corresponds to a different second important object, and the second set of data points may be tagged in the 3D scene such that when the second set of data points fall within a FOV, the region-of-interest is set on and around the second set of data points, and the level-of-detail or resolution for that FOV is set to present the second set of data points without loss of detail based on their positioning in the FOV.

In some embodiments, rendering system 100 renders different parts of a 3D scene or image using different resolutions. In some such embodiments, rendering system 100 improves image quality because some parts of the image that contain more important visual information are rendered at a higher resolution and other parts of the image that contain less important visual information are rendered at a lower resolution. In other words, the image data for a particular FOV is not rendered at the same resolution or level-of-detail that is determined based on the depths or distances for image data in a particular region-of-interest within that particular FOV. Instead, rendering system 100 selects multiple regions-of-interest for a single FOV, and uses the multiple regions-of-interest in conjunction with the depth map created for that single FOV to determine the different levels-of-detail and/or resolutions at which to render the different parts of the image.

Figure 5:
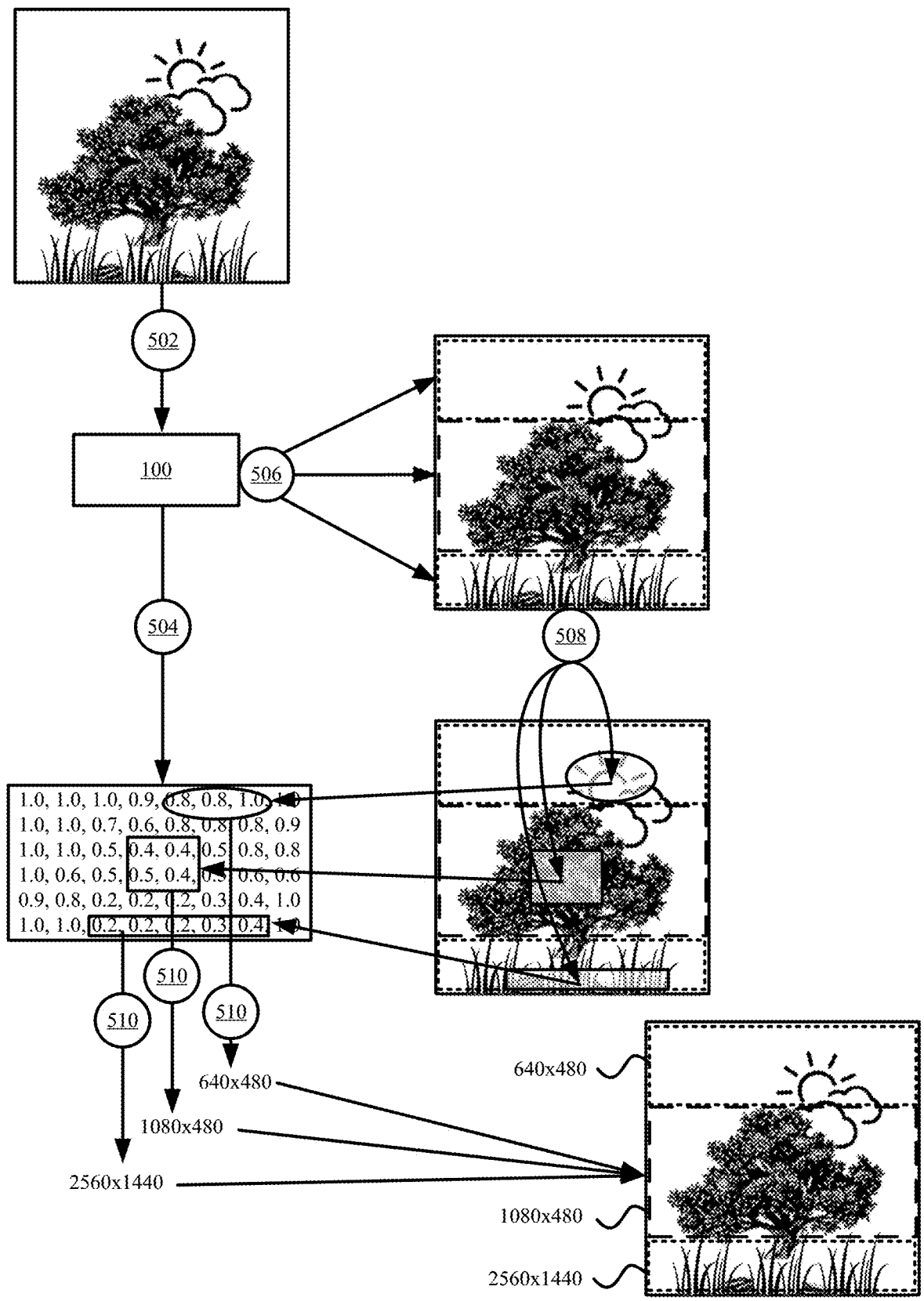
FIG. 5 illustrates an example of dynamically rendering regions from a particular FOV at different resolutions based on the depth map and different regions-of-interest defined for the particular FOV in accordance with some embodiments presented herein.

FIG. 5 illustrates an example of dynamically rendering regions from a particular FOV at different resolutions based on the depth map and different regions-of-interest defined for the particular FOV in accordance with some embodiments presented herein. Rendering system 100 receives (at 502) a request to render the particular FOV.

Rendering system 100 generates (at 504) the depth map for the particular FOV based on the values defined for the positional elements of the image data within the particular FOV. Image data that is in the near plane of the particular FOV or that is closest to the position of the camera defining the particular FOV is given a smaller value in the depth map than image data that is in the far plane of the particular FOV or that is furthest from the camera position.

Rather than define a single region-of-interest from which to set the level-of-detail or resolution for the whole FOV, rendering system 100 partitions (at 506) the particular FOV into different subregions, and defines (at 508) a region-of-interest for each partitioned subregion of the particular FOV. A different sized, shaped, or position region-of-interest may be defined (at 508) for each partitioned subregion based on the image data or data points contained within each partitioned subregion.

Rendering system 100 obtains the depths or distances in the depth map for the data points within each region-of-interest, and sets (at 510) a different level-of-detail or resolution at which to render the data points within each partitioned region based on the depths or distances obtained for the data points in the defined region-of-interest for that region. Rendering system 100 renders (at 512) the image data within each partitioned region at the level-of-detail or resolution set (at 510) for that region. For instance, the minimum depth or distance in the region-of-interest of a first partitioned subregion may be closer or less than the minimum depth or distance in the region-of-interest of a second partitioned subregion. Accordingly, rendering system 100 renders (at 512) the data points in the first partitioned subregion at a higher level-of-detail and/or resolution than the data points in the second partitioned subregion. In this manner, image data for a foreground region of the particular FOV is rendered at a higher resolution than image data for a background region of the particular FOV.

Although FIG. 5 illustrates the rendering of different nonoverlapping regions at different resolutions of the particular FOV, the different resolutions may be applied to overlapping image data in different planes of the particular FOV. For instance, image data in a first set of planes closest to the particular FOV near plane or camera position may be rendered at a higher first resolution, and image data in a second set of planes closest to the particular FOV far plane or that are furthest from the camera may be rendered at a lower second resolution so that the overall image for the particular FOV is presented at the higher first resolution even though less of the image data in the second set of planes is rendered than the image data in the first set of planes.

In some embodiments, rendering system 100 applies a shaping function that ensures a gradual transitioning in detail or resolution between the neighboring subregions rather than a stark difference in detail or resolution when the depths or distances in the regions-of-interest for the neighboring subregion varies greatly. In some such embodiments, rendering system 100 allows the user to configure the speed or intensity with which the shaping function transitions the detail or resolution between the neighboring subregions. Rendering system 100 is able to render different parts of the image at differing levels-of-detail or different resolutions without creating visual discontinuity between the different parts of the image.

Rendering system 100 may also apply the shaping function when rendering images for sequential FOVs. For instance, one or more data points in the region-of-interest of a first FOV may be close to the render position or the near plane of the first FOV such that the first FOV is rendered at high first level-of-detail or resolution. However, the camera may move away from those one or more data points such that all data points in the region-of-interest of a second FOV are far from the render position or the near plane of the second FOV. Rather than abruptly shift from rendering the first FOV at the high first level-of-detail or resolution to rendering the second FOV at a low second level-of-detail or resolution and create visual discontinuity between the first image for the first FOV and the second image for the second FOV and/or an abrupt change in the level-of-detail or resolution, rendering system 100 may apply the shaping function to render the image for the second FOV at an intermediate third level-of-level or resolution that gradually decreases from the high first level-of-detail or resolution, and may continue to lower the level-of-detail or resolution in subsequent frames of an animation that remains on the second FOV until the low second level-of-detail or resolution is reached. For instance, if the camera or render position remains on the second FOV for 2 seconds and the rendering system 100 generates images at 30 frames per second, then rendering system 100 may use the 2 seconds or 60 frames to gradually decrease from the high first level-of-detail or resolution to the low second level-of-detail or resolution.

Rendering system 100 may account for other factors besides distance from the camera or render position when determining the level-of-detail or resolution at which to render the image data within a particular FOV. For instance, rendering system 100 may account for motion or changes to the camera or render position in determining what level-of-detail or resolution to render each FOV spanned by the changing camera or render position. Humans do not perceive moving images or objects with the same visual acuity as stationary images or objects. Accordingly, rendering system 100 accounts for motion to reduce the overhead associated with rendering images from a frequently changing FOV.

Figure 6:
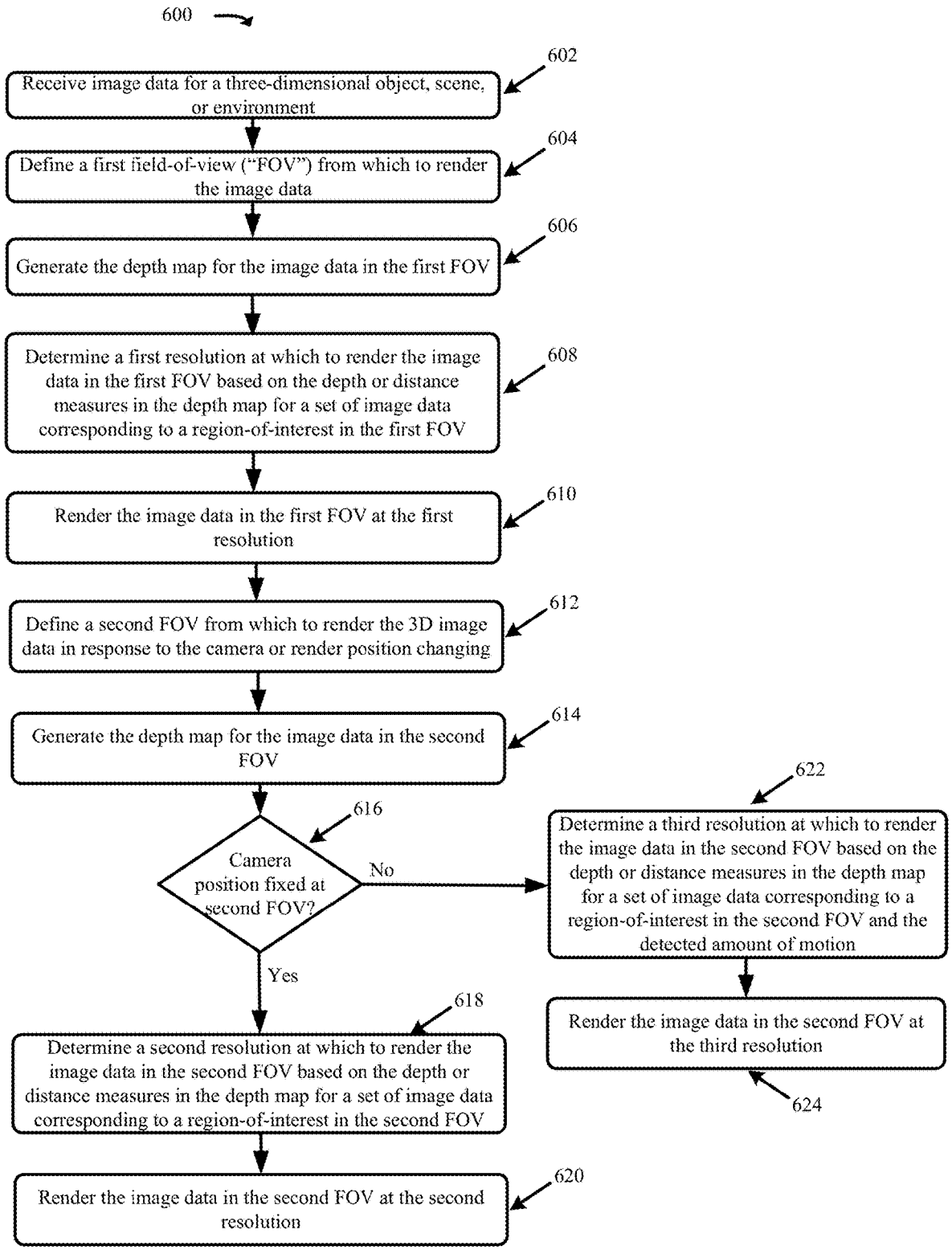
FIG. 6 presents a process for performing the dynamic image rendering based on depth maps and motion associated with changing FOVs in accordance with some embodiments presented herein.

FIG. 6 presents a process 600 for performing the dynamic image rendering based on depth maps and motion associated with changing FOVs in accordance with some embodiments presented herein. Process 600 is implemented by rendering system 100. Rendering system 100 may include processing (e.g., one or more central processing units, graphical processing units, etc.), memory, storage, network, and/or other hardware resources of one or more local or distributed machines that generate images from 3D image data included in point clouds and other 3D image formats or models. For instance, rendering system 100 may be part of a local device used to access, view, edit, and/or otherwise interact with the 3D image data, or may be part of one or more remote devices that are accessed over a data network and that perform the dynamic image rendering on behalf of one or more local devices. The local device may be used to define animations, movements in a point cloud, and/or edits to the point cloud, and the remote devices may be configured with more powerful hardware resources than the local device such that the rendering of the animations, movements, and/or edits may be performed in less time on the remote devices than on the local device.

Process 600 includes receiving (at 602) 3D image data for an object, scene, or environment. The 3D image data may be in the form of point cloud data points, polygonal meshes, and/or other 3D constructs that are positioned in space to form a 3D model of the object, scene, or environment.

Process 600 include defining (at 604) a first FOV from which to render the 3D image data. The first FOV may be generated in response to user input that positions a virtual camera or that sets the render position for the first FOV. In some embodiments, the first FOV is specified as a starting FOV in an animation that moves the camera to different positions in the 3D space of the 3D image data.

Process 600 includes generating (at 606) the depth map for the 3D image data in the first FOV. The depth map is generated (at 606) based on the depth or distance between the 3D image data in the first FOV and a near plane of the first FOV or a camera position from which the first FOV is established.

Process 600 includes determining (at 608) a first resolution at which to render the 3D image data in the first FOV based on the depth or distance measures in the depth map for a set of image data corresponding to a region-of-interest in the first FOV.

Process 600 includes rendering (at 610) the image data in the first FOV at the first resolution. Rendering system 100 dynamically adjusts the quality for the rendered image based on the distance or depth of the presented image data relative to the view frustum.

Process 600 includes defining (at 612) a second FOV from which to render the 3D image data in response to the camera or render position changing. The second FOV includes different 3D image data than the first FOV, and presents a different part of the object, scene, or environment modeled by the 3D image data.

Process 600 includes generating (at 614) the depth map for the 3D image data in the second FOV. In some embodiments, rendering system 100 updates the depth map as new image data comes into the current FOV.

Process 600 includes determining (at 616) whether the camera or render position has stopped on the second FOV. For instance, rendering system 100 may receive input that continues changing the camera or render position from the second FOV to a third FOV while rendering system 100 is rendering the second FOV.

In response to determining (at 616—Yes) that the camera position is fixed on the second FOV and has not moved off the second FOV, process 600 includes determining (at 618) a second resolution at which to render the 3D image data in the second FOV based on the depth or distance measures in the depth map for a set of image data corresponding to a region-of-interest in the second FOV. Rendering system 100 may apply a shaping function to adjust the second resolution when the delta or difference between the first resolution and the second resolution is greater than a threshold. The shaping function ensures a gradual increase or decrease in resolution between the first frame or image and the second frame or image and prevents an abrupt change in resolution when the image data shifts between near and far planes in the first FOV and the second FOV.

Process 600 further includes rendering (at 620) the image data in the second FOV at the second resolution to produce a second image or second frame of the animation. The second resolution may be different than or the same as the first resolution depending on the depth of the image data in the first and second FOVs.

In response to determining (at 616—No) that the camera position is not fixed on the second FOV and has moved off the second FOV, process 600 includes determining (at 622) a third resolution at which to render the 3D image data in the second FOV based on the depth or distance measures in the depth map for a set of image data corresponding to a region-of-interest in the second FOV and the detected amount of motion. In some embodiments, rendering system 100 reduces the resolution based on the detected amount of motion. For instance, if the motion traverses a large first distance in a particular interval, rendering system 100 reduces the resolution by a greater first amount, and if the motion traverses a shorter second distance in the particular interval, rendering system 100 reduces the resolution by a lesser second amount. Process 600 further includes rendering (at 624) the image data in the second FOV at the third resolution.

Rendering system 100 dynamically sets the resolution at which different frames of an animation are rendered based on the depth or distance of the image data in each frame from the camera position, and also based on the amount of motion or camera movement in the animation. As the amount of motion or camera movement increases, the rendering resolution decreases to produce a motion blur effect. Similarly, as the amount of motion or camera movement decreases or stops, the rendering resolution increases to produce a sharper image with more detail to represent the viewing of a static scene.

Figure 7:
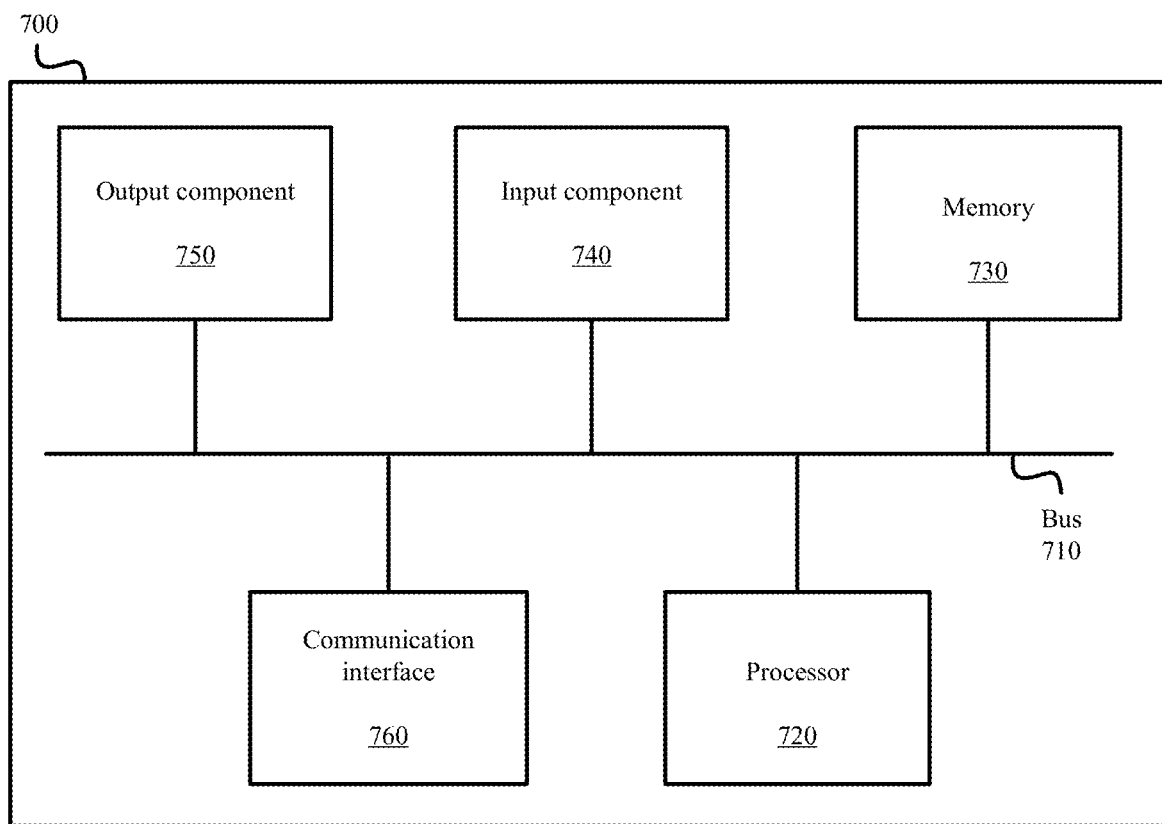
FIG. 7 illustrates example components of one or more devices, according to one or more embodiments described herein.

FIG. 7 is a diagram of example components of device 700. Device 700 may be used to implement one or more of the devices or systems described above (e.g., rendering system 100). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a request to render a plurality of image data distributed in a three-dimensional ("3D") space from a first field-of-view ("FOV");
   selecting a first set of the plurality of image data that is within the first FOV;
   generating a depth map for the first FOV, wherein the depth map comprises a set of distance measures for different distances or depths of the first set of image data in the first FOV;
   selecting a first resolution at which to render the first FOV based on the set of distance measures from the depth map;
   rendering the first set of image data at the first resolution;
   selecting a second set of the plurality of image data that is within a second FOV;
   determining that distances or depths of the second set of image data differ from the distances or depths of the first set of image data;
   adjusting the first resolution based on differences between the distances or depths of the second set of image data and the distances or depths of the first set of image data; and
   rendering the second set of image data at a second resolution defined from adjusting the first resolution.

2. The method of claim 1, wherein generating the depth map comprises:
   determining a position of a camera that establishes the first FOV in the 3D space; and
   computing the different distances or depths based on differences between the position of the camera and different positions of the first set of image data in the 3D space.

3. The method of claim 1 further comprising:
   determining a region-of-interest within the first FOV;
   selecting a subset of the set of distance measures defined in the depth map based on distances or depths of a subset of the first set of image data that are within the region-of-interest; and
   wherein selecting the first resolution comprises defining the first resolution based on the subset of distance measures defined in the depth map for the subset of image data that are within the region-of-interest.

4. The method of claim 1, wherein selecting the first resolution comprises:
   determining a minimum distance measure from a subset of the set of distance measures, wherein the subset of distance measures specify distances or depths of a subset of the first set of image data within a region-of-interest; and
   setting the first resolution based on the minimum distance measure.

5. The method of claim 1, wherein selecting the first resolution comprises:
   determining a subset of the set of distance measures corresponding to distances or depths of a subset of the first set of image data within a region-of-interest; and
   deriving the first resolution based on the subset of distance measures.

6. The method of claim 1, wherein selecting the first resolution comprises:
   determining a region-of-interest within the first FOV, wherein the region-of-interest comprises a subset of the first set of image data; and
   defining the first resolution based on a subset of the set of distance measures obtained from the subset of image data in the region-of-interest.

7. The method of claim 6, wherein determining the region-of-interest comprises:
   defining the region-of-interest to include a first subset of the first set of image data in response to non-positional elements of the first subset of image data having greater variation than non-positional elements of a second subset of the first set of image data; and
   defining the region-of-interest to include the second subset of image data in response to the non-positional elements of the second subset of image data having greater variation than the non-positional elements of the first subset of image data.

8. The method of claim 6, wherein determining the region-of-interest comprises:
identifying a center of the first FOV; and
defining the region-of-interest around the subset of image data at the center of the first FOV.

9. The method of claim 6, wherein determining the region-of-interest comprises:
determining a first subset of the first set of image data that represents an object within the first FOV and other image data from first the set of image data that represents a background within the first FOV; and
defining the region-of-interest around the first subset of image data.

10. The method of claim 6, wherein determining the region-of-interest comprises:
tracking a focus of a viewer;
determining that the focus of the viewer is on a region comprising the subset of image data; and
defining the region-of-interest to include the subset of image data based on said tracking the focus and determining that the focus is on the region comprising the subset of image data.

11. The method of claim 1, wherein rendering the first set of image data at the first resolution comprises:
obtaining a tree-based representation for the first set of image data, wherein the tree-based representation comprises a plurality of leaf nodes and a plurality of parent nodes at a layer above the plurality of leaf nodes, wherein the plurality of leaf nodes stores the first set of image data, and wherein each parent node of the plurality of parent nodes is linked to two or more leaf nodes of the plurality of leaf nodes and represents image data stored by the two or more leaf nodes at a reduced resolution;
determining that the first resolution corresponds to the reduced resolution; and
rendering the image data stored by the plurality of parent nodes at the reduced resolution instead of the first set of image data stored by the plurality of leaf nodes.

12. The method of claim 1, wherein rendering the first set of image data at the first resolution comprises:
determining that the first resolution corresponds to a particular parent layer in a tree-based representation of the first set of image data that is above a leaf node layer; and
rendering decimated image data contained in nodes of the particular parent layer in response to determining that the first resolution corresponds to the particular parent layer.

13. The method of claim 1 further comprising:
detecting movement of a camera away from the first FOV; and
reducing the first resolution in response to detecting the movement of the camera away from the first FOV.

14. A rendering system comprising:
one or more hardware processors configured to:
receive a request to render a plurality of image data distributed in a three-dimensional ("3D") space from a first field-of-view ("FOV");
select a first set of the plurality of image data that is within the first FOV;
generate a depth map for the first FOV, wherein the depth map comprises a set of distance measures for different distances or depths of the first set of image data in the first FOV;
select a first resolution at which to render the first FOV based on the set of distance measures from the depth map;
render the first set of image data at the first resolution;
select a second set of the plurality of image data that is within a second FOV;
determine that distances or depths of the second set of image data differ from the distances or depths of the first set of image data;
adjust the first resolution based on differences between the distances or depths of the second set of image data and the distances or depths of the first set of image data; and
render the second set of image data at a second resolution defined from adjusting the first resolution.

15. The rendering system of claim 14, wherein generating the depth map comprises:
determining a position of a camera that establishes the first FOV in the 3D space; and
computing the different distances or depths based on differences between the position of the camera and different positions of the first set of image data in the 3D space.

16. The rendering system of claim 14, wherein the one or more hardware processors are further configured to:
determine a region-of-interest within the first FOV;
select a subset of the set of distance measures defined in the depth map based on distances or depths of a subset of the first set of image data that are within the region-of-interest; and
wherein selecting the first resolution comprises defining the first resolution based on the subset of distance measures defined in the depth map for the subset of image data that are within the region-of-interest.

17. A method comprising:
receiving a request to render a plurality of image data distributed in a three-dimensional ("3D") space from a particular field-of-view ("FOV");
selecting a set of the plurality of image data that is within the particular FOV;
generating a depth map for the particular FOV, wherein the depth map comprises a set of distance measures for different distances or depths of the set of image data in the particular FOV;
determining a region-of-interest within the particular FOV, wherein the region-of-interest comprises a subset of the set of image data, wherein determining the region-of-interest comprises:
defining the region-of-interest to include a first subset of the set of image data in response to non-positional elements of the first subset of image data having greater variation than non-positional elements of a second subset of the set of image data; and
defining the region-of-interest to include the second subset of image data in response to the non-positional elements of the second subset of image data having greater variation than the non-positional elements of the first subset of image data;
selecting a dynamic resolution at which to render the particular FOV based on a subset of the set of distance measures obtained from the subset of image data in the region-of-interest; and
rendering the set of image data at the dynamic resolution.

18. A rendering system comprising:
one or more hardware processors configured to:
- receive a request to render a plurality of image data distributed in a three-dimensional ("3D") space from a particular field-of-view ("FOV");
- select a set of the plurality of image data that is within the particular FOV;
- generate a depth map for the particular FOV, wherein the depth map comprises a set of distance measures for different distances or depths of the set of image data in the particular FOV;
- determine a region-of-interest within the particular FOV, wherein the region-of-interest comprises a subset of the set of image data, wherein determining the region-of-interest comprises:
  - defining the region-of-interest to include a first subset of the set of image data in response to non-positional elements of the first subset of image data having greater variation than non-positional elements of a second subset of the set of image data; and
  - defining the region-of-interest to include the second subset of image data in response to the non-positional elements of the second subset of image data having greater variation than the non-positional elements of the first subset of image data;
- select a dynamic resolution at which to render the particular FOV based on a subset of the set of distance measures obtained from the subset of image data in the region-of-interest; and
- render the set of image data at the dynamic resolution.

19. A method comprising:
- receiving a request to render a plurality of image data distributed in a three-dimensional ("3D") space from a particular field-of-view ("FOV");
- selecting a set of the plurality of image data that is within the particular FOV;
- generating a depth map for the particular FOV, wherein the depth map comprises a set of distance measures for different distances or depths of the set of image data in the particular FOV;
- selecting a dynamic resolution at which to render the particular FOV based on the set of distance measures from the depth map;
- obtaining a tree-based representation for the set of image data, wherein the tree-based representation comprises a plurality of leaf nodes and a plurality of parent nodes at a layer above the plurality of leaf nodes, wherein the plurality of leaf nodes stores the set of image data, and wherein each parent node of the plurality of parent nodes is linked to two or more leaf nodes of the plurality of leaf nodes and represents image data stored by the two or more leaf nodes at a reduced resolution;
- determining that the dynamic resolution corresponds to the reduced resolution; and
- rendering the image data stored by the plurality of parent nodes at the reduced resolution instead of the set of image data stored by the plurality of leaf nodes.

20. A rendering system comprising:
one or more hardware processors configured to:
- receive a request to render a plurality of image data distributed in a three-dimensional ("3D") space from a particular field-of-view ("FOV");
- select a set of the plurality of image data that is within the particular FOV;
- generate a depth map for the particular FOV, wherein the depth map comprises a set of distance measures for different distances or depths of the set of image data in the particular FOV;
- select a dynamic resolution at which to render the particular FOV based on the set of distance measures from the depth map;
- obtain a tree-based representation for the set of image data, wherein the tree-based representation comprises a plurality of leaf nodes and a plurality of parent nodes at a layer above the plurality of leaf nodes, wherein the plurality of leaf nodes stores the set of image data, and wherein each parent node of the plurality of parent nodes is linked to two or more leaf nodes of the plurality of leaf nodes and represents image data stored by the two or more leaf nodes at a reduced resolution;
- determine that the dynamic resolution corresponds to the reduced resolution; and
- render the image data stored by the plurality of parent nodes at the reduced resolution instead of the set of image data stored by the plurality of leaf nodes.

* * * * *